(12) United States Patent
Westerheide et al.

(10) Patent No.: US 12,236,686 B2
(45) Date of Patent: Feb. 25, 2025

(54) INTELLIGENT MOBILE OILFIELD ANALYTICS PLATFORM

(71) Applicant: Baker Hughes Oilfield Operations LLC, Houston, TX (US)

(72) Inventors: John Westerheide, Edmond, OK (US); Dustin Sharber, Oklahoma City, OK (US); Jeffrey Potts, Oklahoma City, OK (US); Mahendra Joshi, Katy, TX (US); Xiaoqing Ge, Oklahoma City, OK (US); Jeremy Van Dam, Oklahoma City, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 463 days.

(21) Appl. No.: 17/501,792

(22) Filed: Oct. 14, 2021

(65) Prior Publication Data
US 2022/0114373 A1 Apr. 14, 2022

Related U.S. Application Data

(60) Provisional application No. 63/091,750, filed on Oct. 14, 2020.

(51) Int. Cl.
*G06V 20/56* (2022.01)
*G06F 18/214* (2023.01)
(Continued)

(52) U.S. Cl.
CPC ............ *G06V 20/56* (2022.01); *G06F 18/214* (2023.01); *G06F 18/25* (2023.01); *G06V 20/40* (2022.01)

(58) Field of Classification Search
CPC ......... G06V 20/56; G06V 20/40; G06F 18/25
See application file for complete search history.

(56) References Cited

U.S. PATENT DOCUMENTS

2007/0260405 A1* 11/2007 McConnell ............ G06Q 99/00
702/24
2008/0002914 A1* 1/2008 Vincent ................ G06V 30/164
382/187
(Continued)

FOREIGN PATENT DOCUMENTS

EP 2942615 A1 11/2015

OTHER PUBLICATIONS

International Search Report and Written Opinion issued in connection with corresponding PCT Application No. PCT/US21/55035 dated Jan. 24, 2022.
(Continued)

*Primary Examiner* — David Perlman
(74) *Attorney, Agent, or Firm* — Crowe & Dunlevy, P.C.

(57) ABSTRACT

A distributed monitoring and analytics system is configured to automatically monitor conditions in a remote oil field. The distributed monitoring and analytics system generally includes one or more mobile monitoring units that each includes a vehicle, a sensor package within the vehicle that is configured to produce one or more sensor outputs as the mobile monitoring unit traverses the remote oil field, and an onboard computer configured to process the output from the sensor package. The sensor package can include any number of sensors, including a camera that outputs a video signal for computer vision analysis and a gas detector that outputs a gas detection signal based on the detection of fugitive gas emissions within the remote oil field.

5 Claims, 4 Drawing Sheets

(51) Int. Cl.
    *G06F 18/25*    (2023.01)
    *G06V 20/40*    (2022.01)

(56) References Cited

U.S. PATENT DOCUMENTS

| | | | |
|---|---|---|---|
| 2012/0084047 A1* | 4/2012 | Vesterdal | B65G 67/00 |
| | | | 702/141 |
| 2017/0193719 A1* | 7/2017 | Haci | H04N 7/188 |
| 2018/0188129 A1* | 7/2018 | Choudhury | G01N 21/85 |
| 2018/0266944 A1 | 9/2018 | Waxman et al. | |
| 2019/0303648 A1 | 10/2019 | Zhai et al. | |
| 2020/0320659 A1 | 10/2020 | Whiting et al. | |
| 2021/0037197 A1* | 2/2021 | Kester | G06V 10/147 |

OTHER PUBLICATIONS

Examination Report; IP Australia; Application No. 2021360916; Nov. 15, 2023.
Examination Report No. 1 for Canadian Application No. 3195359, dated Aug. 26, 2024.
European Search Report and Written Opinion for PCT/US2021/55035 mailed Aug. 2, 2024.

* cited by examiner

INTELLIGENT MOBILE OILFIELD ANALYTICS PLATFORM

RELATED APPLICATIONS

This application claims the benefit of U.S. Provisional Patent Application Ser. No. 63/091,750 filed Oct. 14, 2020 entitled, "Intelligent Mobile Oilfield Analytics Platform," the disclosure of which is herein incorporated by reference.

FIELD OF THE INVENTION

This invention relates generally to the field of monitoring systems, and more particularly but not by way of limitation, to an analytics platform based on distributed mobile sensor systems that may find utility in monitoring oilfield and other remotely situated assets and projects.

BACKGROUND

Many of the most productive oil and gas assets are located in remote areas, with equipment and personnel often distributed over a large area. In these areas, it is particularly difficult to obtain real-time or near real-time monitoring of equipment, conditions and the status of operations. It is similarly challenging to identify and locate the source of fugitive emissions of potentially dangers emissions from well sites, processing facilities, tank batteries and gathering systems. It is difficult to accurately and quickly detect oilfield gas leaks given the inherent remoteness and distributed nature of the equipment and other assets that are potential sources of fugitive emissions. In some remote sites where internet connectivity is unavailable, it is impossible to transmit critical information between remote sites, shops and offices in a timely fashion. As operators in the oil and gas industry continue to reduce fugitive emissions of greenhouse gases and other pollutants and potentially harmful gases, there is a need for an improved monitoring system that can improve real-time personnel safety and remote site security monitoring. It is to this and other needs that the present disclosure is directed.

SUMMARY OF THE INVENTION

In one embodiment, the present disclosure is directed at a distributed monitoring and analytics system for use in monitoring conditions in a remote location. The distributed monitoring and analytics system includes a vehicle, a sensor package installed within the vehicle and configured to produce one or more sensor outputs as the vehicle traverses the remote location, and an onboard computer configured to process the output from the sensor package.

In another embodiment, the present disclosure is directed at a distributed monitoring and analytics system for use in monitoring conditions in a remote oil field, where the distributed monitoring and analytics system has a plurality of mobile monitoring units that each includes a sensor package configured to produce one or more sensor outputs as the mobile monitoring unit traverses the remote oil field, and an onboard computer configured to process the output from the sensor package.

In yet another embodiment, the present disclosure is directed to a distributed monitoring and analytics system for use in monitoring conditions in a remote oil field. In this embodiment, the distributed monitoring and analytics system has a plurality of mobile monitoring units that each includes a vehicle, a sensor package within the vehicle that is configured to produce one or more sensor outputs as the mobile monitoring unit traverses the remote oil field, and an onboard computer configured to process the output from the sensor package. In this embodiment, the sensor package includes a camera that outputs a video signal for computer vision analysis, and a gas detector that outputs a gas detection signal based on the detection of fugitive gas emissions within the remote oil field.

BRIEF DESCRIPTIONS OF THE DRAWINGS

WRITTEN DESCRIPTION

Figure 1:
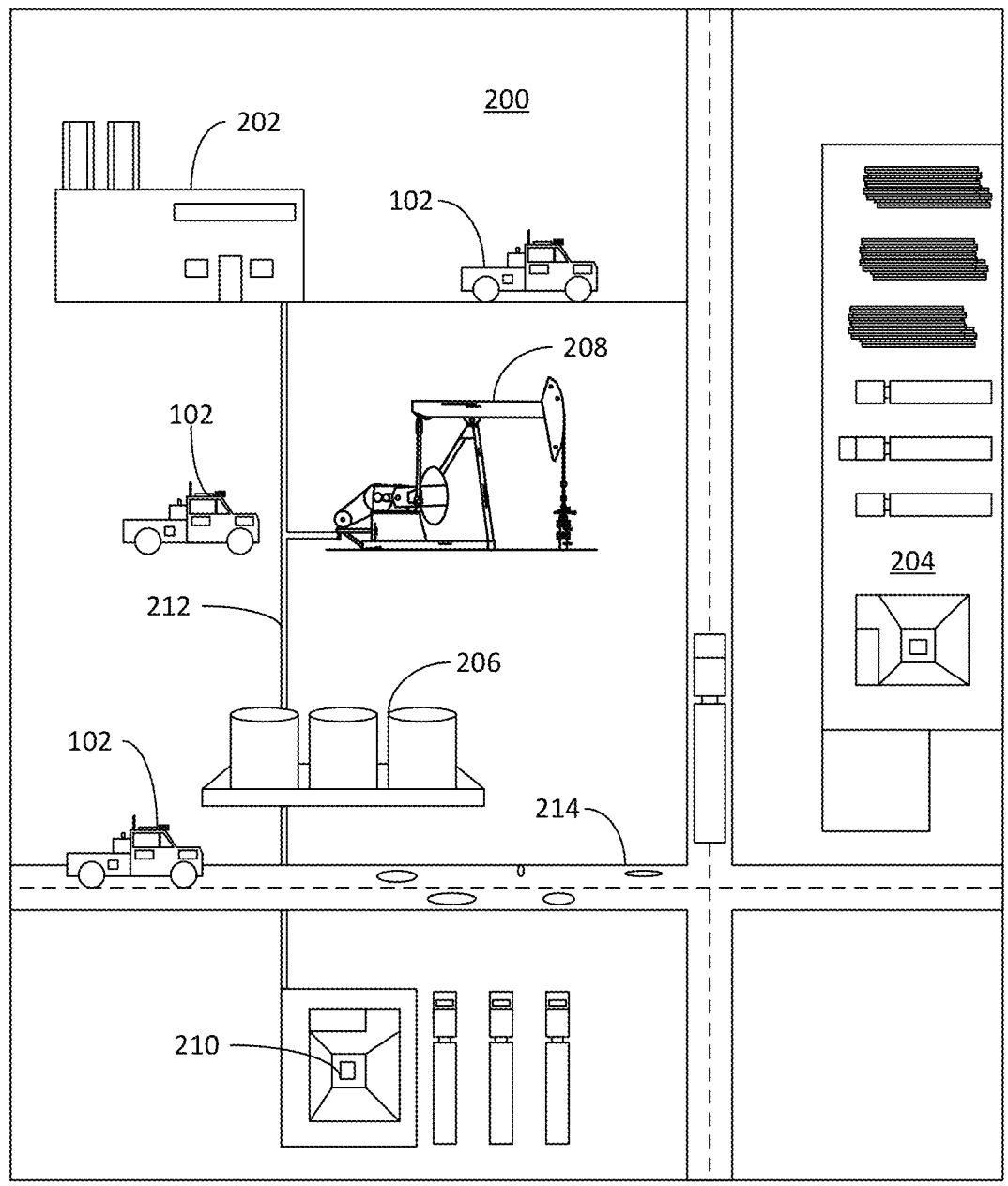
FIG. 1 is an illustration of an area within an oil field in which a plurality of mobile monitoring units are present as part of a distributed monitoring and analytics system.

Beginning with FIG. 1, shown therein is a depiction of an oil field 200 in which a number of assets have been deployed to find, produce, gather and process petroleum products from an underground reservoir. As used herein, the term "oil field" refers to the surface properties above and around an underground petroleum producing reservoir. In the example depicted in FIG. 1, the oil field 200 includes a processing plant 202, a service yard 204 that includes pipe, trucks and other equipment, a tank battery 206 configured to store liquids produced from a pump jack 208. An active drill site 210 is also included in the oil field 200. A pipeline gathering system 212 connects the petroleum producing, storage and processing facilities. Roads 214 cross the oil field 200. Although the roads 214 are depicted as being paved and lined, it will be appreciated that in many oil fields 200, a majority of the roads 214 are not paved. It will be appreciated that the assets depicted in FIG. 1 are merely exemplary and a given oil field 200 may include fewer or additional assets. The oil field 200 may have limited internet connectivity and cellular service.

A distributed monitoring and analytics system 100 has been deployed to the oil field 200. The distributed monitoring and analytics system 100 includes a plurality of mobile monitoring units 102. In the embodiment depicted in FIG. 1, the mobile monitoring units 102 are service vehicles that are commonly used to transport people and equipment to assets located in the oil field 200. Although the mobile monitoring unit 102 is configured as a pickup truck in FIG. 1, it will be appreciated that the mobile monitoring units 102 can also be passenger cars, semi-tractors or trailers, and vehicles specifically adapted for use in the oil field 200 (e.g., wireline vans, drilling rigs, etc.). In exemplary embodiments, the mobile monitoring units 102 are vehicles that would otherwise be traveling through the oil field 200.

Figure 2:
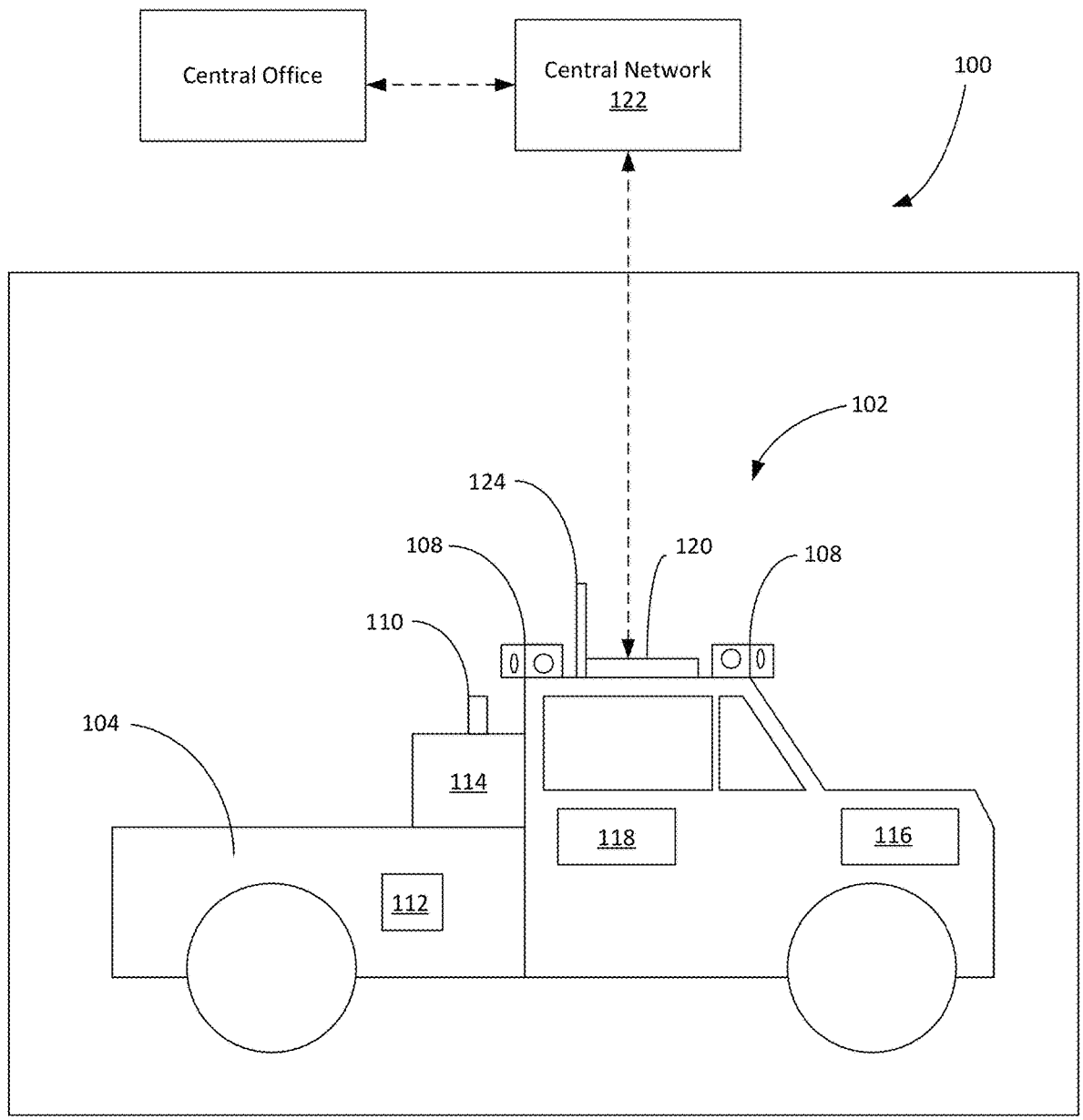
FIG. 2 is a depiction of a mobile monitoring unit from the distributed monitoring and analytics system of FIG. 1.

The mobile monitoring unit 102 is depicted in greater detail in FIG. 2. In exemplary embodiments, the mobile monitoring unit 102 includes a vehicle 104 (a pickup truck is depicted) that is otherwise configured as a service vehicle. The mobile monitoring unit 102 includes a sensor package 106 that includes one or more sensors that are configured to detect and analyze conditions within the oil field 200. In some embodiments, the sensors include cameras 108, gas detectors 110, accelerometers 112, and location identifiers 114. The sensor package 106 can also be configured to interface directly with the onboard sensors 116 in the vehicle 104, such as time of day, vehicle speed, outside temperature and weather conditions. The output from the sensor package 106 is presented to an onboard computer 118 that is equipped to analyze the output from the sensor package 106 and produce interpreted results in real time or near real time based on the conditions observed as the vehicle 104 travels through the oil field 200. The vehicle 104 can be provided with a communications module 120 that is configured to exchange data with a central network 122 when the vehicle 104 is within range of a wireless connection (e.g., cellular, WiFi, WiMax).

The cameras 108 can be high definition cameras that are capable of continuously scanning the portions of the oil field 200 surrounding the vehicle 104. The cameras 108 produce a camera output (static images and video) which is provided to the onboard computer 118. The onboard computer 118 includes a graphics processing unit that is capable of quickly analyzing the images from the cameras 108. The onboard computer 118 is configured with machine learning algorithms and a local database of known features in the oil field 200. The onboard computer 118 is configured to identify features (e.g., pump 208 or tank battery 206) in the images produced by the cameras 108.

The gas detectors 110 are also configured to continuously measure the concentration of gases that are potentially released as fugitive emissions from the oil field 200. The gas detectors 110 can be configured to measure the concentration of volatile organic compounds (VOCs), including methane, ethane, benzene, toluene, ethylbenzene and xylenes (BTEX). The gas detectors 110 produce a gas detector output that is provided to the onboard computer 118.

The sensor package 106 may include additional sensors on the mobile monitoring unit 102, including weather sensors 124 that can be configured to detect wind speed, temperature, humidity, barometric pressure, and altitude/elevation. The weather sensors 124 are configured to produce a weather output at the vehicle 104 in real time. In some embodiments, the local weather conditions at the vehicle 104 can be determined using a commercial weather service based on the location of the vehicle 104 at a given time.

The output from each of the sensors within the sensor package 106 is paired in real time with location identification produced by the location identifier 114. The location identifier 114 can be a standalone GPS unit or a module that receives location information from the onboard sensors 116 or from a separate device that provides real-time location information. When aggregated with location information, the camera output and gas detector output can be used to detect fugitive emissions from the oil field 200 and identify the source or sources of those fugitive emissions.

In exemplary embodiments, the onboard computer 118 is capable of aggregating, processing and generating findings in real time based on the output from the sensor package 106. In this way, each vehicle 104 participates in an edge computing system in which the local onboard computer 118 in each vehicle performs the data processing and analytical operations. The output from the onboard computer 118 can be shared with the central network 122 when the communications module 120 is connected to a suitable data network. In other embodiments, some portion of the processing is conducted by computers within the central network 122 through a data connection using the communications module 120. For example, the onboard computer 118 can be provided with updated electronic signatures for improving the machine learning functions carried out by the onboard computer 118 on output from the sensor package 106.

Figure 3:
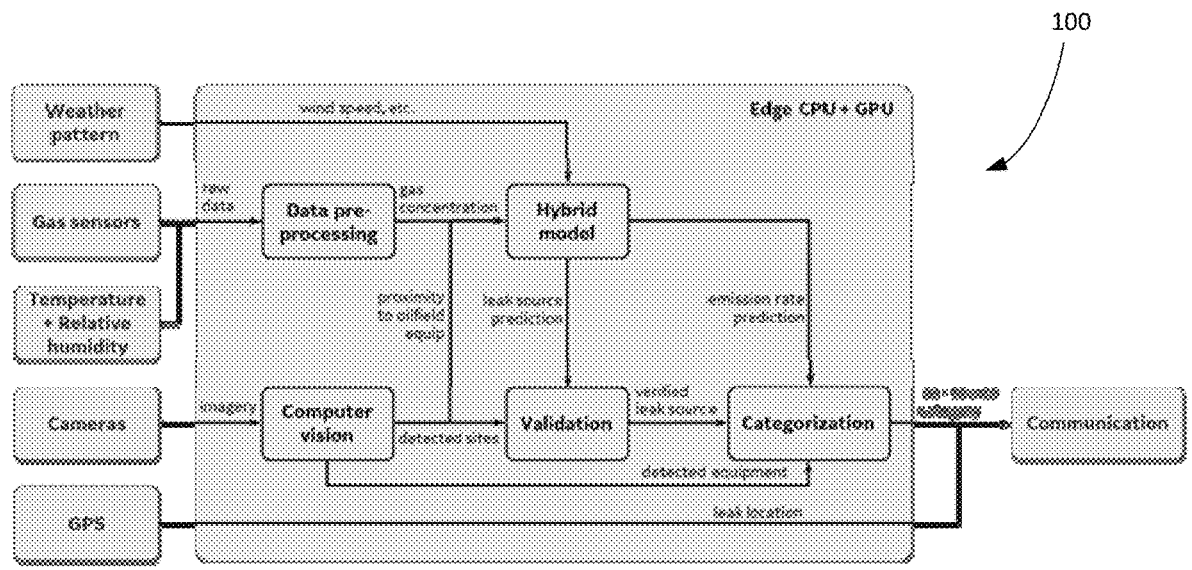
FIG. 3 is a process flow diagram showing an exemplary process for the multimodal analysis of fugitive emissions in an oil field.

Turning to FIG. 3, shown therein is an exemplary flowchart for aggregating, processing and generating findings based on the output from the sensor package 106. In this example, the onboard computer 118 is engaged in determining the source of a fugitive emission, the estimated rate of the emission, and the area impacted by the leak. On the front end of the process, the weather data, gas detector output, camera data and location data is aggregated and assimilated within the onboard computer 118. The onboard computer 118 is configured to analyze the gas detection output (e.g., the concentration of methane at a particular location) combined with weather conditions (e.g., humidity and wind) at a plurality of locations within the oil field 200 encountered by the mobile monitoring unit 102 to develop a predictive model of the location and rate of the hydrocarbon leak.

When the onboard computer 118 determines that a fugitive emission is present in the area traversed by the vehicle 104, the output from the cameras 108 can be evaluated by the onboard computer 118 to predict which type of equipment is potentially responsible for the fugitive emission (e.g., the pipeline gathering system 212 or the pump jack 208). The onboard computer 118 is configured to apply machine learning to the images recorded by the cameras 108 in a particular location corresponding to the predicted source of the fugitive emission to present the driver, operator, or controller with an indication that a particular asset in the oil field 200 is potentially responsible for the fugitive emission.

Thus, in addition to using a plurality of spaced apart and location-based measurements obtained from the gas detectors 110 and weather sensors 124 to predict the location of the source of the fugitive emission using modeling algorithms based on gas concentration and weather conditions, the output from the cameras 108 can be used to validate the source of the leak by specifically identifying the asset or type of asset in the location in which the leak is predicted to have originated.

FIG. 3 demonstrates how the distributed monitoring and analytics system 100 improves accuracy and reduces uncertainty in the detection of fugitive emissions through sensor fusion and data analytics. Enabled by the powerful edge-based GPU device, computer vision models are deployed at the edge to capture critical visionary information such as proximity, size, category, operating status of potential leaking equipment in real time. Gas sensor raw measurement, temperature, and relative humidity are cleaned, pre-processed, and converted into gas concentration. A machine learning model takes multiple gas concentration data points revealing the spatial and temporal distribution, computer-vision-generated metadata and weather pattern to predict leak source distance and rate. The model is a hybrid one combining the merits of physical based models and data driven methods. It captures the system characteristics based on physical principles while allowing flexible parameter tuning using empirical data through machine learning technologies.

Figure 4:
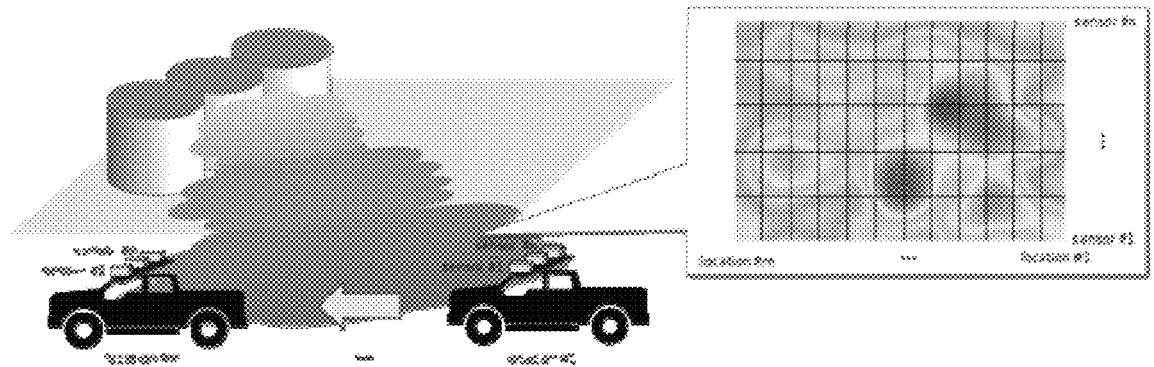
FIG. 4 is a graphical representation of mobile monitoring units encountering a fugitive petroleum emission and the computer-generated map indicating the location and severity of the leak.
Figure 5:
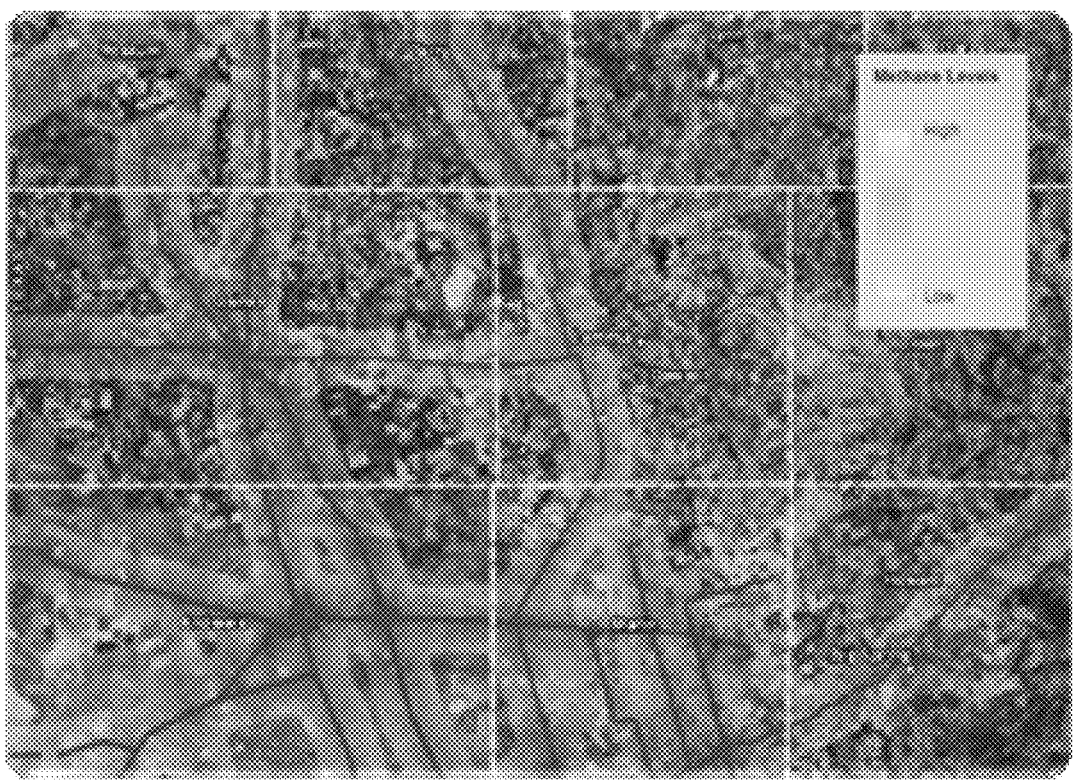
FIG. 5 is a representative graphical output from the distributed monitoring and analytics system showing an estimate of methane levels within a remote oil field.

FIG. 4 illustrates an example of the use of the distributed monitoring and analytics system 100 for identifying the source of a fugitive emission from a tank battery 206 within the oil field 200. A mobile monitoring unit 102 driving through the oil field 200 in proximity to the tank battery 206 detects the presence of a fugitive gaseous emission (e.g., methane) in varying concentrations at various locations. By aggregating weather data, gas detector data and location data, the onboard computer 118 can predict the distribution of the emission within the oil field 200 using a hybrid model, including an indication of the location of the source of the fugitive emission. The camera output can be paired with the location data to identify the type of asset that is likely the source of the leak. In this way, the onboard computer 118 is configured to both validate the predictive modeling used to identify the source of the fugitive emission, but also to assist the driver or operator in expeditiously resolving the fugitive emission. The advanced machine learning technologies are applied to the sensor data fusion to accurately detect emission location and rate in real time. As illustrated in FIG. 4, an exposure map can be quickly generated to help assess and contain the fugitive emissions. FIG. 5 presents a broader map in which methane concentration levels have been mapped onto the roads 214 within the oil field 200.

In addition to providing inputs for leak source/rate prediction, computer vision models could also be used as validation against model prediction. For example, if the hybrid model predicts that there is a leak 0.2 miles north of the vehicle 104, the camera output imagery would tell whether the prediction is correct, partially correct (e.g., the direction is right but the distance is off) or completely inaccurate (there is no leaking source at predicted location).

The computer vision process can also provide assistance in leak source categorization. Emission rates are directly proportional to the "Emission Factor" (EF), which depends on the equipment type, activity value (unit activity per unit time) and operating factor (the fraction of time the source is active). The Emission Factor can be used to indicate the type of leaking equipment, the responsible oilfield activity, and the scope and size of the fugitive emissions. Examples of Emission Factors assigned to various activities in the oil field 200 are provided below.

| Activity | Emission Factor |
| --- | --- |
| Flange/pipe fitting leaks | 1 |
| Dynamic seals/compressor rod/packing/wet seals | 2 |
| Pneumatic actuators | 3 |
| Oil storage tanks | 4 |
| Drilling/mud pit | 5 |
| Flow back and production | 6 |
| Flaring | 7 |
| Gas sweetening units | 8 |
| Gas pipeline pigging | 9 |
| Gas processing plants | 10 |

By combining both emission rate prediction and equipment type identified by computer vision models on a site, the distributed monitoring and analytics system 100 is able to further categorize the type of equipment that is leaking. Detection results, including leak source GPS location, leaking equipment type, are sent back to the central network 122 for follow-up actions, such as scheduling a higher-fidelity inspection.

In addition to assisting with the detection and identification of fugitive emissions and leaks, the distributed monitoring and analytics system 100 can also be used to provide additional intelligence about conditions in the oil field 200.

Figure 6:
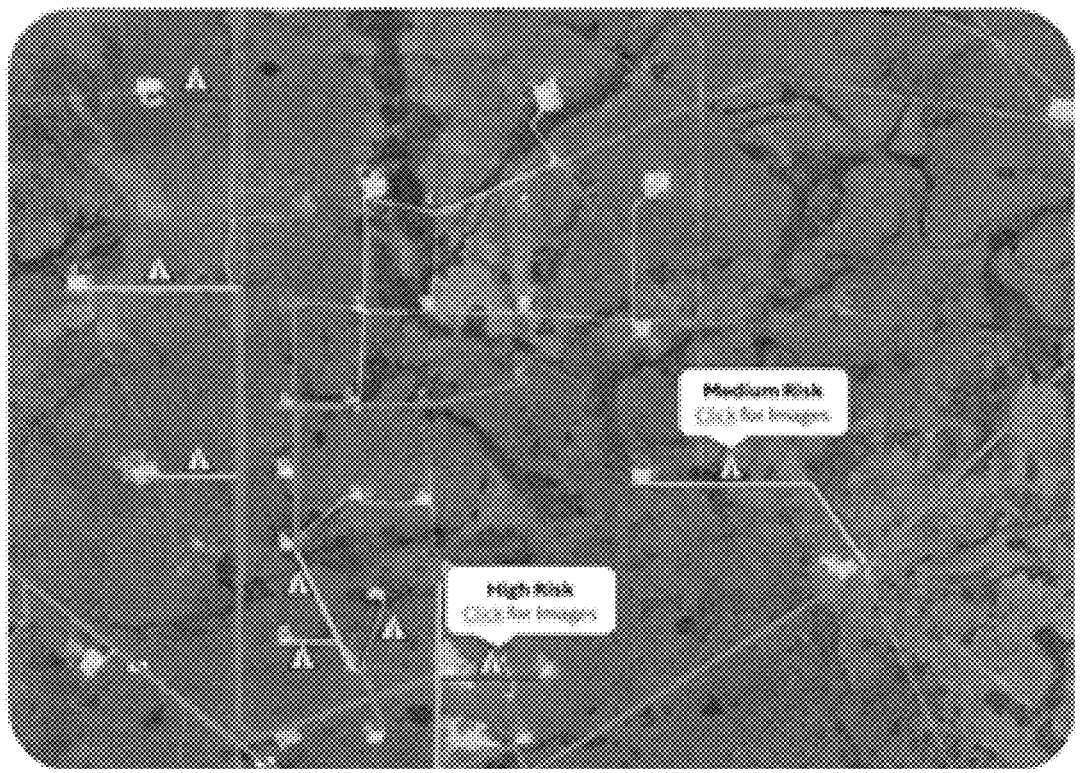
FIG. 6 is a representative graphical output from the distributed monitoring and analytics system showing an evaluation of the condition of roads within a remote oil field.

For example, the accelerometers 112 can be configured within the vehicle 104 to detect the conditions of the roads 214. If the roads 214 are poorly maintained or otherwise rough, the accelerometers 112 produce an accelerometer output that indicates the vehicle 104 is traversing bumps, pot holes or rough terrain. The accelerometer data is provided with location data to the onboard computer 118, which is capable of characterizing the state of the roads 214 within the oil field 200, as depicted in FIG. 6. The distributed monitoring and analytics system 100 can likewise be configured to identify specific hazards or disruptions to the oil field 200, including road hazards, accidents, excessive traffic, fires, and other natural disasters. The distributed monitoring and analytics system 100 can tap into the stock onboard sensors 116 included within the vehicle 104 to monitor the driver proficiency and safety.

As an additional example, the camera output can be reviewed by machine learning within the onboard computer 118 to identify specific assets in the oil field 200. For example, the mobile monitoring unit 102 driving past the service yard 204 could detect an increase in drill pipe, stacked rigs or other equipment used in extracting hydrocarbons from underground reservoirs. Thus, the onboard computer 118 can be configured to produce reports indicating an increase or decrease in equipment within specific locations in the oil field 200. The cameras 108 and onboard computer 118 can also be trained to identify specific company logos, trade dress, color schemes, or branding that can be used to provide market intelligence about specific companies operating within the oil field 200.

In another aspect, the distributed monitoring and analytics system 100 can be configured to identify periodic changes to the oil field 200. For example, the distributed monitoring and analytics system 100 can be configured to automatically monitor the progression of the drill site 210, including rig-up, active drilling and rig-down operations.

Thus, the distributed monitoring and analytics system 100 provides a mobile analytics solution for real-time, accurate emission detection, environment monitoring and oilfield activities tracking. The infrastructure features novel sensor fusion algorithms, advanced machine learning/image analytics technologies and edge computing device to improve operational efficiency, safety while building unique oilfield market intelligence with low cost and minimum human intervention. This distributed monitoring and analytics system 100 introduces a novel approach that fuses computer vision with multiple sensing technologies to quickly and accurately detect the location and emission rate of gas leaks. Sensor fusion, computer vision and machine learning modeling algorithms are deployed and optimized on edge-based computing devices which enable local data analytics in real-time. The distributed monitoring and analytics system 100 is cost-effective because it leverages existing service vehicles 104 with great temporal and spatial coverage. It also reduces the number of static sensors needed because of the mobility of the vehicles 104 within the distributed monitoring and analytics system 100. The distributed monitoring and analytics system 100 analytics platform establishes a mobile network in which each vehicle 104 equipped with the sensor package 106, edge-based onboard computer 118, and communication module 120, becomes a mobile data hub that connects remote oil fields 200 with a central network 122.

As the vehicles are constantly traveling in remote areas, they don't have cloud access for computationally intensive data processing. Therefore, edge computing is required to process time-critical information or filter out irrelevant data.

The key enabler of edge analytics is a low-power-consumption, high-performance embedded AI computing device. The edge-based GPU device runs computer vision model inferencing to monitor road defects (e.g., potholes and rutted surfaces), traffic density, events, incidents, and hazards. It also fuses visionary information with accelerometer measurement to quantify road conditions.

The algorithms can robustly, accurately and in real-time, monitor environment conditions, and ultimately detect if an event has happened. Mitigating the risk is then enacted through intelligent alerting of the driver and informing a wider control system through the central network 122. All associated data recorded by the distributed monitoring and analytics system 100 are saved for thorough analysis. For example, the road conditions, traffic density and incident logs could be studied and correlated to help law enforcement, community and operators better identify route hazards, high risk areas, traffic congestion, and road wear. The same information can be used to improve route planning, journey management and ultimately driving safety with minimum extra efforts. In addition, the distributed monitoring and analytics system 100 tracks the driver's activity on a remote site, it also provides the operator with an efficient way for remote site surveillance and facility/equipment status updates.

In some remote sites where internet connectivity is unavailable, it is impossible to transfer important information like equipment status/health and event logs back to a central office for timely review and actions. Equipped with data ingestion and communication hardware, the vehicle 104 becomes a mobile data hub connecting remote oil fields 200 with a central facility. Conversely, the distributed monitoring and analytics system 100 offers an easier and more efficient data transfer model from the office/shop to the remote oil field 200. For example, before departure, the service or equipment details (drill bit metadata, chemical treating to be performed, etc.) are pre-loaded into the onboard computer 118 of the vehicle 104.

In addition to remote field data, the distributed monitoring and analytics system 100 continually captures dynamic activities in the oil field 200 using automatic object detection algorithms. Local edge computer vision processing filters out irrelevant data that optimizes local data storage. Large coverage and frequent travels in active oil fields 200 enable the vehicles 104 to build unique and valuable market intelligence with spatial and temporal granularities. Spatial distribution offers insights on active areas, market presence, and competitive landscape, while temporal tracking tells how a well pad evolves in its whole life cycle. This information is extremely useful to investors, operators, and service/equipment providers. The ground-based data is complementary to aerial and satellite imagery, which are subject to cloud obstruction, resolution or data update frequency.

Although the distributed monitoring and analytics system 100 has been disclosed in conjunction with operations in the oil field 200, it will be appreciated that the distributed monitoring and analytics system 100 can also be configured for deployment in other remotely situated work environments. The distributed monitoring and analytics system 100 may find particular utility in wind farm constructions, farming operations, pipeline construction projects and road construction projects.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A distributed monitoring and analytics system for use in monitoring conditions in a remote location, the distributed monitoring and analytics system comprising:
   a vehicle configured to transport people and equipment in the remote location;
   a sensor package installed within the vehicle and configured to produce one or more sensor outputs as the vehicle traverses the remote location, wherein the sensor package comprises:
      a gas detector configured to detect the presence of fugitive emissions in the remote location;
      one or more cameras; and
      a location identifier; and
   an onboard computer inside the vehicle and configured to process the output from the sensor package, wherein the onboard computer is configured to:
      automatically process and identify image output from the one or more cameras using machine learning algorithms and a database of known object types in the remote location;
      aggregate the output from the sensor package to predict the source and rate of a fugitive emission in the remote location;
      validate the source of the fugitive emission in the remote location using the output from the one or more cameras; and
      identify the type of equipment leaking at the source of the fugitive emission by determining an Emission Factor based on the rate of the fugitive emission and the output from the one or more cameras, and correlating the determined Emission Factor with the type of equipment present at the source of the fugitive emission.

2. The distributed monitoring and analytics system of claim 1, wherein the sensor package further comprises weather sensors for observing local weather conditions surrounding the vehicle.

3. A distributed monitoring and analytics system for use in monitoring conditions in a remote oil field, the distributed monitoring and analytics system comprising a plurality of mobile monitoring units that each comprises:
   a vehicle;
   a sensor package within the vehicle that is configured to produce one or more sensor outputs as the mobile monitoring unit traverses the remote oil field, wherein the sensor package comprises:
      a camera that outputs a video signal for computer vision analysis; and
      a gas detector that outputs a gas detection signal based on the detection of fugitive gas emissions within the remote oil field; and
   an onboard computer configured to process the output from the sensor package, wherein the onboard computer is configured to:
      predict the rate of a fugitive emission using the one or more sensor outputs;
      validate a source of the fugitive emission in the remote oil field using the one or more sensor outputs;
      identify a type of equipment at the source of the fugitive emission that is responsible for the fugitive emission under a leak source category using the rate of the fugitive emission and the source of the fugitive emission in the remote oil field, wherein the leak source category represents the type of equipment for the source of the fugitive emission; and wherein each of the plurality of mobile monitoring units is configured to automatically identify using computer vision industrial activities taking place within the remote oil field.

4. The distributed monitoring and analytics system of claim 3, wherein the mobile monitoring unit is configured to automatically identify specific companies operating within the remote oil field using computer vision analysis and video signals generated by one or more of the mobile monitoring units.

5. The distributed monitoring and analytics system of claim 3, wherein the onboard computer of one or more of the mobile monitoring units is configured to use a combination of signals produced by the camera and gas detector and observed weather conditions to automatically determine the source of a fugitive gas emission within the remote oil field.

* * * * *